(12) United States Patent
Amir et al.

(10) Patent No.: US 8,577,109 B2
(45) Date of Patent: Nov. 5, 2013

(54) SYSTEMS AND METHODS FOR AUTOMATED EXTRACTION OF MEASUREMENT INFORMATION IN MEDICAL VIDEOS

(75) Inventors: Arnon Amir, Saratoga, CA (US); David James Beymer, San Jose, CA (US); Karen W. Brannon, Palo Alto, CA (US); Sangeeta T. Doraiswamy, San Jose, CA (US); Tanveer Fathima Syeda-Mahmood, Cupertino, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/595,517

(22) Filed: Aug. 27, 2012

(65) Prior Publication Data

US 2012/0321189 A1 Dec. 20, 2012

Related U.S. Application Data

(63) Continuation of application No. 12/842,385, filed on Jul. 23, 2010.

(51) Int. Cl.
*G06K 9/00* (2006.01)

(52) U.S. Cl.
USPC ............................ 382/128; 128/922; 378/4

(58) Field of Classification Search
USPC ......... 382/100, 128, 129, 130, 131, 132, 137, 382/181, 182, 183, 190, 195, 199, 203, 382/206; 128/922; 378/4–27
See application file for complete search history.

(56) References Cited

U.S. PATENT DOCUMENTS

| | | | | |
|---|---|---|---|---|
| 4,596,038 A | * | 6/1986 | Yoshida | 382/182 |
| 5,566,003 A | * | 10/1996 | Hara et al. | 358/448 |
| 5,966,473 A | * | 10/1999 | Takahashi et al. | 382/292 |
| 6,104,833 A | * | 8/2000 | Naoi et al. | 382/190 |
| 6,198,837 B1 | * | 3/2001 | Sasano et al. | 382/132 |
| 6,768,811 B2 | * | 7/2004 | Dinstein et al. | 382/128 |
| 2003/0095694 A1 | * | 5/2003 | Dinstein et al. | 382/128 |
| 2004/0057619 A1 | * | 3/2004 | Lim et al. | 382/182 |

* cited by examiner

*Primary Examiner* — Anand Bhatnagar
(74) *Attorney, Agent, or Firm* — Ference & Associates LLC (57) ABSTRACT

Systems and methods providing automated extraction of information contained in video data and uses thereof are described. In particular, systems and associated methods are described that provide techniques for extracting data embedded in video, for example measurement-value pairs of medical videos, for use in a variety of applications, for example video indexing, searching and decision support applications.

10 Claims, 12 Drawing Sheets

| | | |
|---|---|---|
| Height | 157.5 cm | 5 ft 2 in |
| Weight | 58.96 kg | 130 lb |
| BSA | 1.59 m² | |
| DOB | | |
| Age | Years | |
| Gender | F | |

FIG. 4B

| | | |
|---|---|---|
| Height | 157.5 cm | 5 ft 2 in |
| Weight | 58.96 kg | 130 lb |
| BSA | 1.59 m² | |
| DOB | 403A | |
| Age | Years | |
| Gender | F | |

Patient Name
Hospital Name

09 Jan 04

3:02:55 p.m.
70Hz
120mm

3V2c-S
H4.0MHz
Cardiac
General

T/1-4/2.0
-1dB Δ=1

56dB
Gain=
Store in progress

HR=70bpm

SYSTEMS AND METHODS FOR AUTOMATED EXTRACTION OF MEASUREMENT INFORMATION IN MEDICAL VIDEOS

CROSS REFERENCE TO RELATED APPLICATION

The application is a continuation of U.S. patent application Ser. No. 12/842,385, entitled SYSTEMS AND METHODS FOR AUTOMATED EXTRACTION OF MEASUREMENT INFORMATION IN MEDICAL VIDEOS, filed on Jul. 23, 2010, which is incorporated by reference in its entirety.

BACKGROUND

Video is being increasingly used in healthcare as part of a patient's medical record for storing a diagnostic scan or recording a medical procedure. Thus, medical videos are often produced and stored during procedures such as cardiac catheterizations and echocardiographic exams. For example, echocardiogram (echo) videos are an important modality for cardiac decision support. In addition to describing the shape and motion of the heart, echo videos capture diagnostic measurements as textual feature-value pairs that are indicators of underlying disease. Some examples of diagnostic measurements embedded in these videos as textual feature-value pairs include area of the left ventricle, the velocity of the Doppler flow jet, and mitral valve area. Given the vast number of patients and medical procedures in a typical hospital group and the amount of these videos, leveraging the information they contain in new and useful ways is important.

BRIEF SUMMARY

The subject matter described herein generally relates to automated extraction of information contained in video data and use thereof. In particular, certain subject matter presented herein relates to medical videos and various related applications. Systems and associated methods are described that provide techniques for extracting data embedded in video, for example feature-value pairs (name-value pairs) of medical videos, for use in a variety of applications, for example video indexing, searching and decision support applications.

In summary, one aspect provides a method for providing one or more video data applications comprising: accessing one or more frames of video data; preprocessing said one or more frames of video data to produce one or more preprocessed frames; extracting embedded characters from said one or more preprocessed frames; and utilizing said embedded characters extracted from said one or more preprocessed frames for one or more of a decision support application and an automated archive storage application.

The foregoing is a summary and thus may contain simplifications, generalizations, and omissions of detail; consequently, those skilled in the art will appreciate that the summary is illustrative only and is not intended to be in any way limiting. For a better understanding of the embodiments, together with other and further features and advantages thereof, reference is made to the following description, taken in conjunction with the accompanying drawings. The scope of the invention will be pointed out in the appended claims.

BRIEF DESCRIPTION OF THE SEVERAL VIEWS OF THE DRAWINGS

FIG. 4(A-D) illustrates example video frames and example preprocessed video frames.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the claims, but is merely representative of certain example embodiments.

Reference throughout this specification to "embodiment(s)" means that a particular feature, structure, or characteristic described in connection with the embodiment is included in at least one embodiment. Thus, the appearances of "embodiment(s)" in various places throughout this specification are not necessarily all referring to the same embodiment.

Furthermore, the described features, structures, or characteristics may be combined in any suitable manner in one or more embodiments. In the following description, numerous specific details are provided to give a thorough understanding of example embodiments. One skilled in the relevant art will recognize, however, that aspects can be practiced without one or more of the specific details, or with other methods, components, materials, et cetera. In other instances, well-known structures, materials, or operations are not shown or described in detail to avoid prolixity.

For the purposes of description, cardiac echocardiogram (echo) videos are used as a non-limiting example. It should be noted, however, that the embodiments are not limited to use in connection with cardiac echo videos. Therefore, those having ordinary skill in the art will recognize that the example embodiments described herein are easily extendable and thus equally applicable to other types of medical videos and to video data generally. As such, the example embodiments can be adapted to accommodate a variety of use contexts, such as where videos contain embedded character-based information (for example text, numerical values and the like) that can be utilized for a variety of applications, such as intelligent organizing/indexing/retention of videos, supporting intelligent searching of videos, and/or supporting various decision support applications.

While there is considerable work on both optical character recognition (OCR) in videos and in document layout analysis, each has shortcomings. Extraction of text from videos has been an active research problem in the last decade. The accuracy of such systems has not reached the performance obtained by more developed OCR engines for documents due to the complex backgrounds present in videos.

Considerable work has also been done in tabular structure analysis in documents. Most common are bottom-up approaches that build the table in a data driven manner exploiting general a priori knowledge about table formatting. Frequently, it involves locating horizontal and vertical ruled lines bounding the table cells, grouping the cell text into rows and columns using vertical and horizontal projections, building an adjacency graph on text regions, or modeling as a tree structure.

Due to the constrained nature of the text-only pages in the videos, a top-down approach based on templates from exemplars is utilized by embodiments for these page types. Top-down templates have also been suggested by prior work, although in handling billing statements and detecting tables by their headers, not as applied to video data.

The retrieval of similar videos for cardiac decision support using video-derived features has been reported, where a limited number of diseases could be distinguished due to the small number of features used. Textual measurements on the other hand, as used by embodiments, can give enough features to capture a larger complexity of cases where patients have more than one disease, making them practical for decision support. Thus, although prior techniques have been developed for OCR, table layout analysis, and decision support, none uses disease-specific feature-value pairs from embedded text in videos, as per the embodiments presented herein.

As above, cardiac echo videos are an important source of diagnostic information in cardiac decision support. Captured during an echocardiographic exam, these videos depict shape and motion of the heart from different viewpoints. In addition, they capture important measurements such as area of the left ventricle (an area of the heart, the velocity of the Doppler flow jet of moving blood, and mitral valve area (a valve separating the left atrium and the left ventricle). These important measurements are often represented in the echo videos as text feature-value pairs.

The echo videos often contain a variety of page types. For example, an echo video may include cine loops (looped video clips/segments derived from ultrasound data) of the heart or portions thereof, still images having a picture of the heart as well as text feature-value pairs, or text-only stills that contain text feature-value pairs and/or other information. Embedded in these echo videos is information that can be used for a wide variety of applications.

The description now turns to the figures, and illustrated example embodiments are described. The illustrated example embodiments will be best understood by reference to the figures. The following description is intended only by way of example, and simply illustrates certain embodiments.

Figure 1:
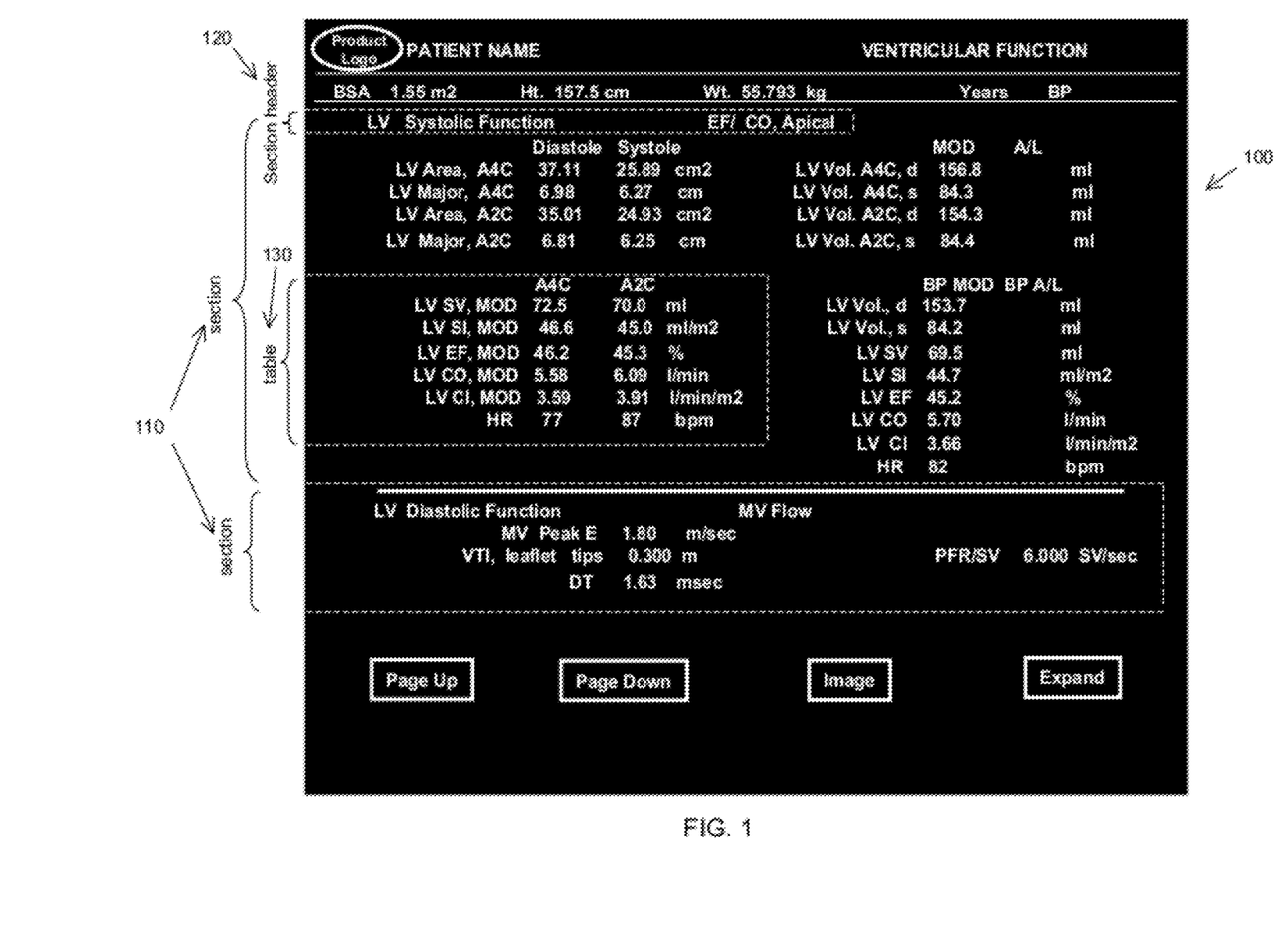
FIG. 1 illustrates a text-only video frame.

FIG. 1 is an example illustration of a text-only page (frame) from an echocardiogram. The text-only page includes sections 110, section headers 120 for each section 110, and tables 130 of values within each section. As can be seen, relevant features and their values (that is, feature-value pairs or measurement-value pairs, such as left ventricle (LV) area and its value at diastole of 37.11 cm$^2$) are grouped by cardiac regions (for example, LV, mitral valve (MV)). These feature-value pairs appear in an implicit tabular format with rows corresponding to specific measurements, and columns capturing temporal points in the heart cycle (systolic, diastolic), different viewpoints and/or computational methods for estimation. The tabular format is dictated by the machine type.

In FIG. 1, some features included left ventricular (LV) area, A4C (Apical 4-Chamber, which is a particular instrument viewpoint for capturing data) and LV volume, A4C. Some specific measurements include values for LV volume and LV area for various features. Some different viewpoints include A4C, A2C (Apical 2-Chamber). Some computational methods for estimation include "method of disks" (MOD) and "Area Length" (A/L).

Cardiologists use these measurements produced during an exam to assist in making conclusions about disease conditions. For example, the LV ejection fraction (EF) illustrated in FIG. 1 is 45.2%, which may indicate a left ventricular dysfunction. Thus, sufficient information is available from these features to infer disease conditions, and moreover a use of similarity between cardiac echo videos includes decision support. That is, a cardiologist may utilize similarity between echo videos to help in making a particular diagnosis. Moreover, this information can prove useful when deciding how, when and which medical videos to retain or archive.

Figure 2:
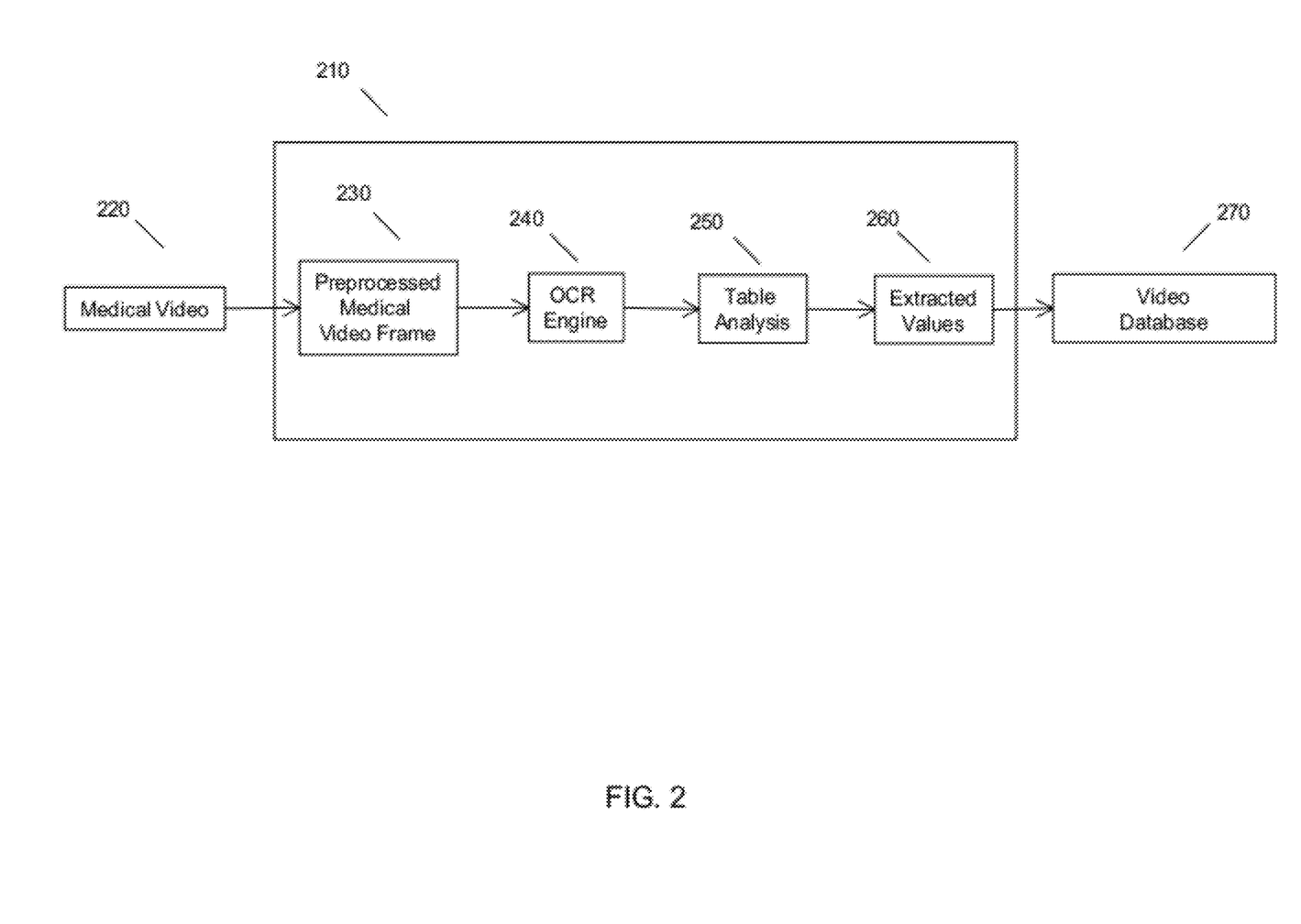
FIG. 2 illustrates an example system for providing one or more video data applications based on extracted information.
Figure 3:
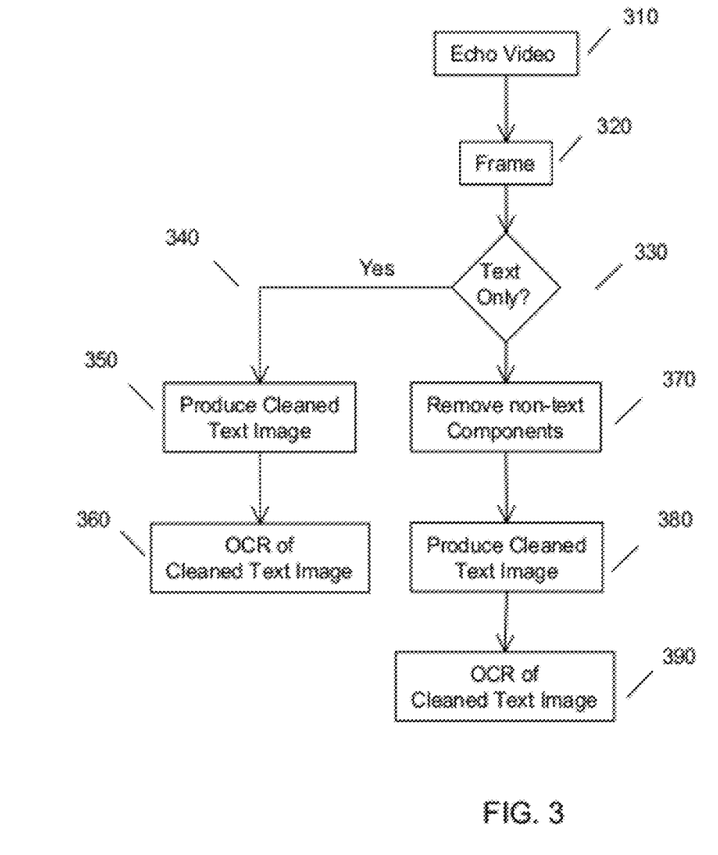
FIG. 3 illustrates an example method of preprocessing a video frame.

Referring to FIG. 2, a high-level overview of a system for managing cardiac echo videos based on feature-value pairs extracted from embedded text regions in videos is illustrated. Given an input medical video 220, a system 210 preprocesses a frame 230 of the medical video 220. To reliably extract the embedded text for optical OCR of characters, embodiments use image processing operations based on mathematical morphology, edge detection and rank filtering. This is then followed by grouping and connected components analysis to prepare the text regions for an OCR engine 240. Next, embodiments employ a table analysis module 250 to detect the tabular layout structure within the video frame that depicts measurements to capture the pairings of features with their values. Each echo video 220 is thus represented as a set of feature-value pairs, which can be stored in memory 260 as extracted values. The system 210 can then be utilized to intelligently index and archive the medical video frames and/or entire medical videos, support searching of the medical video frames and/or entire medical videos, and support decision support applications. For example, similar echo videos are obtained by ranking videos contained in a database of videos 270 using a similarity metric that captures the fraction of overlap between features with similar values. Embodiments can thus be used in an application of similarity retrieval of videos for clinical decision support.

Video Pre-processing for OCR

For text-only page recognition (FIG. 4A), such as identifying a page type as illustrated in FIG. 1, a set of product logo templates can be made for various echo machine models (for example, a set of templates can be made for a Siemens Sequoia® ultrasonic medical diagnostic apparatus). Normalized correlation in pre-determined regions in successive video frames makes it possible to recognize the machine model in a given video. Alternatively, metadata associated with the video may be available that makes the machine model explicitly available (for example, using Digital Imaging and Communications in Medicine (DICOM) tags, which are usually filled in for this field). Once the machine type is known a pre-determined template of text-only frames is used to separate the text-only frames from the rest of the video data. Sequoia® is a registered trademark of Siemens Medical Solutions USA, Inc. in the United States and other countries.

Figure 4A:
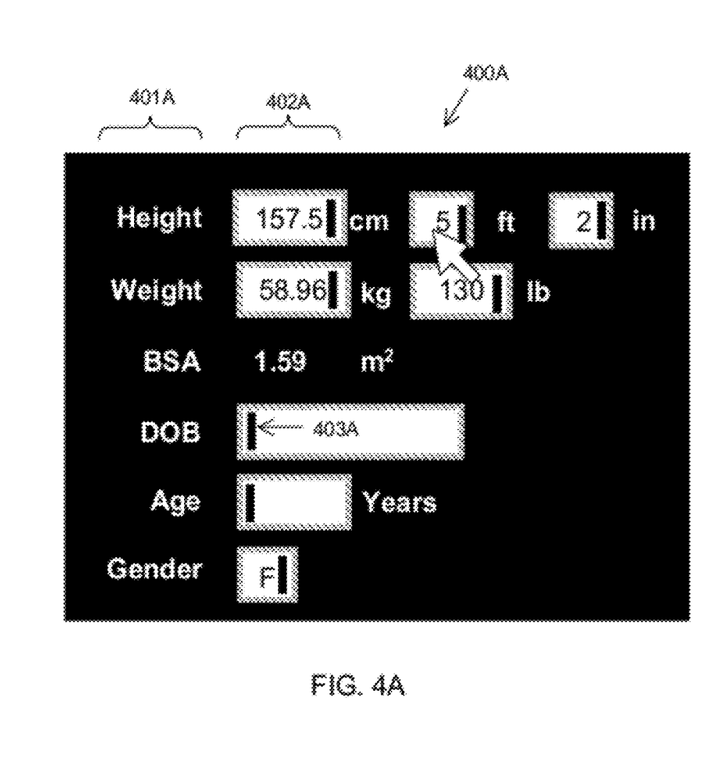
Figure 4B:
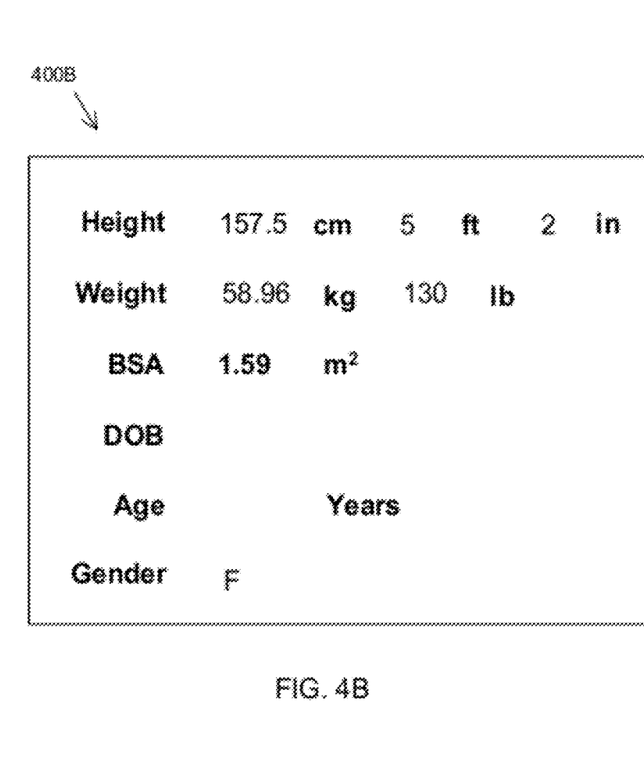
Figure 4C:
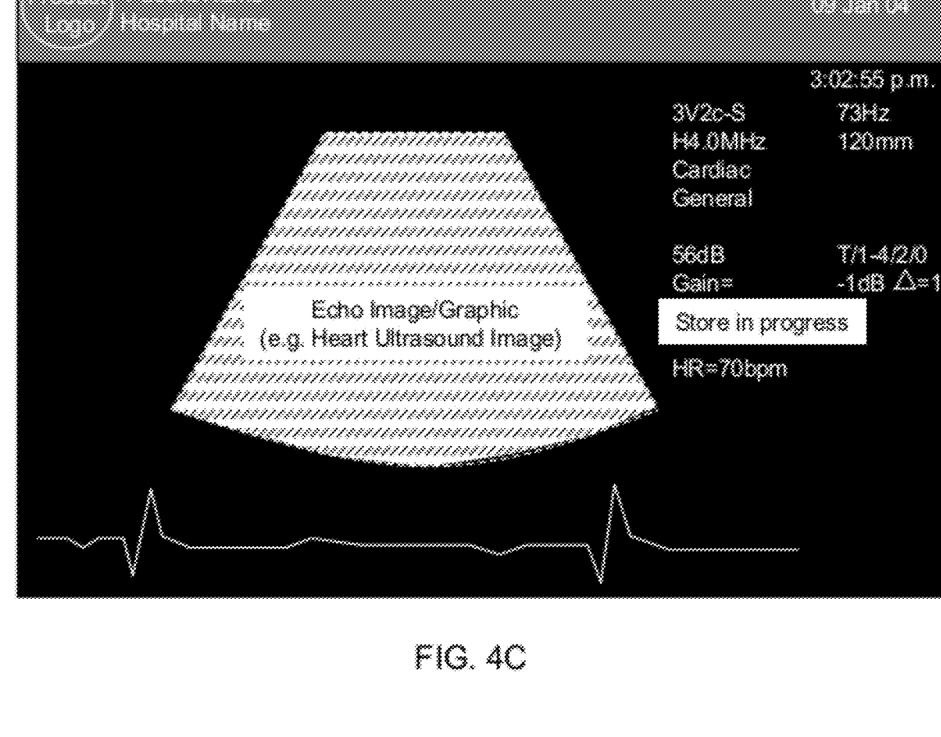

Given a collection of echo clips from one patient visit, embodiments first access a video clip's 310 frames 320 and identify text-only frames (for example, FIG. 4A) and separate them 340 from the rest of the video frames. Embodiments then extract text-containing regions of the text only frames and assemble them into a single image 350 (cleaned text image, as for example illustrated in FIG. 4B) for optical character recognition 360, as described herein. Frames containing additional information (that is, the frames not determined to be text-only frames, for example as illustrated in FIG. 4C) are also preprocessed, first by removing non-text components 370 and then by cleaning the frame into a cleaned text image 380 to prepare for OCR 390, as described further herein.

For extraction of text/character containing regions of a video frame that is not a text-only frame (FIG. 4C), embodiments first preprocess the video frame to eliminate certain aspects of the frame that can cause inaccurate OCR. Echocardiogram frames contain various image, graphical and textual information in a compact visual presentation. The non-textual aspects of the frame are removed 370 to produce a cleaned text image 380 (for example, as illustrated in FIG. 4D), increasing OCR accuracy.

Figure 4D:
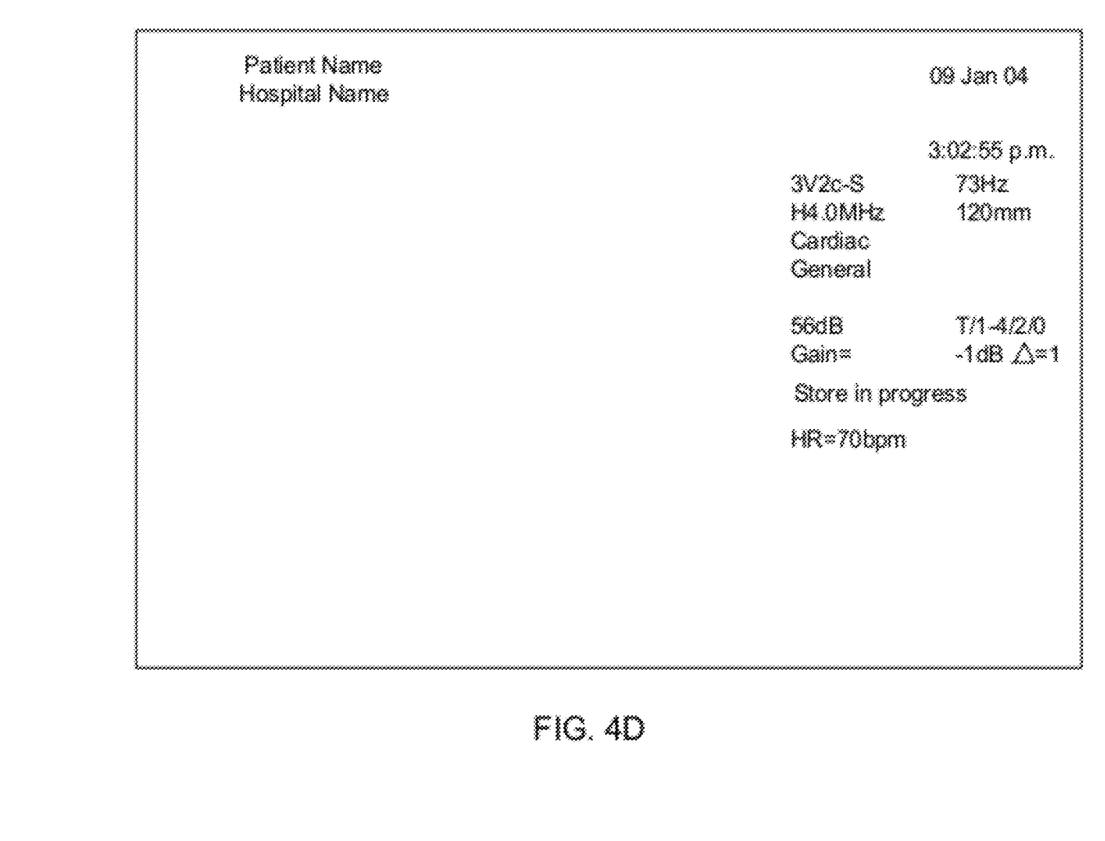

For example, as illustrated in FIG. 4D, an Echo frame may contain one or more echo regions (Echo Image/Graphic, for example a heart ultrasound image), ECG (electrocardiogram) curve, rulers, markers, calipers and other graphical objects. The removal process 370 applies a morphological close operation, computes connected components, and detects the echo region as the largest component in the frame. Then, a polygonal boundary of the region is computed, the convex hull of that polygon is computed, and finally is filled up with background color to remove the echo image from the frame.

To detect the ECG graph, an ECG detection technique is applied. The ECG is a narrow, long, continuous, generally horizontal curve. First, a horizontal edge detection is applied, followed by a morphological operation to detect two edge pixels in close vertical proximity with a bright pixel between them. Then a connected components algorithm is applied. Last, for each component, a bounding box and its vertical-projected histogram (a column vector, each cell containing the count of pixels in each row) are computed. The ECG curve should have a bounding box higher than 1 or two pixels (which would correspond to a straight line), and is longer than a certain minimum length (in many cases the ECG breaks into two parts, right at the point of the ECG cursor). The ECG reference line would be at the line corresponding to the peak in the vertical pixel projection. Once the line is detected, it is used to group together all pieces of the ECG curve into one long curve. The ECG curve is then dilated by a circle of radius 2 and the resulted region is erased from the frame by filling it with background color. After removing the non-textual components from the frame, it goes through text clean to produce a cleaned text image, described below. The final result of the preprocessing of FIG. 4C is depicted in FIG. 4D. A cleaned text frame such as that illustrated in FIG. 4D is the input to the OCR engine 240.

Text clean (producing a cleaned text image from a frame) is useful for bringing all the text components to unified face and background color, and removing any non-textual (but often text-like) graphics which may reduce the accuracy of OCR.

For echo video frames, the text may appear in several different colors and gray levels. Some parts may be highlighted and rendered in inverse colors (black on white), for example the illustrated features 401A of "Height", "Weight", "BSA", "DOB", "Age" and "Gender". Another example are areas of a frame containing graphics, such as illustrated in FIG. 4C, where the "Store in progress" text is highlighted and rendered in inverse colors from other text. The text-only frame 400A may contain input fields 402A for the various features 401A, bordered with lines. Similarly, a frame containing graphics (FIG. 4C) may also contain different formatting lines or other frame variations.

Hence, the preprocessing techniques are general enough to deal with such variations in order to separate graphics, lines, curves and other features from text, and to normalize the text to the same color, distinguishable from the background of the frame.

For example, each input field 402A contains a caret 403A, often connected to one of the characters. Before an OCR engine can effectively process such a frame 400A, any non-textual/character content should be removed and the text appearance should be made homogeneous for optimal OCR performance.

One technique employed by embodiments is that of foreground-background segmentation. For optimal OCR recognition, regions of text of different color or gray level are detected and normalized. Text and graphics in echo videos are often associated with designated colors or gray level bands. If those gray level bands are present, embodiments provide automatic processing that detects the bands, labels them as foreground or background, processes the content of each foreground band, and remove lines and other non-textual graphics before normalizing the text gray levels.

Figure 5:
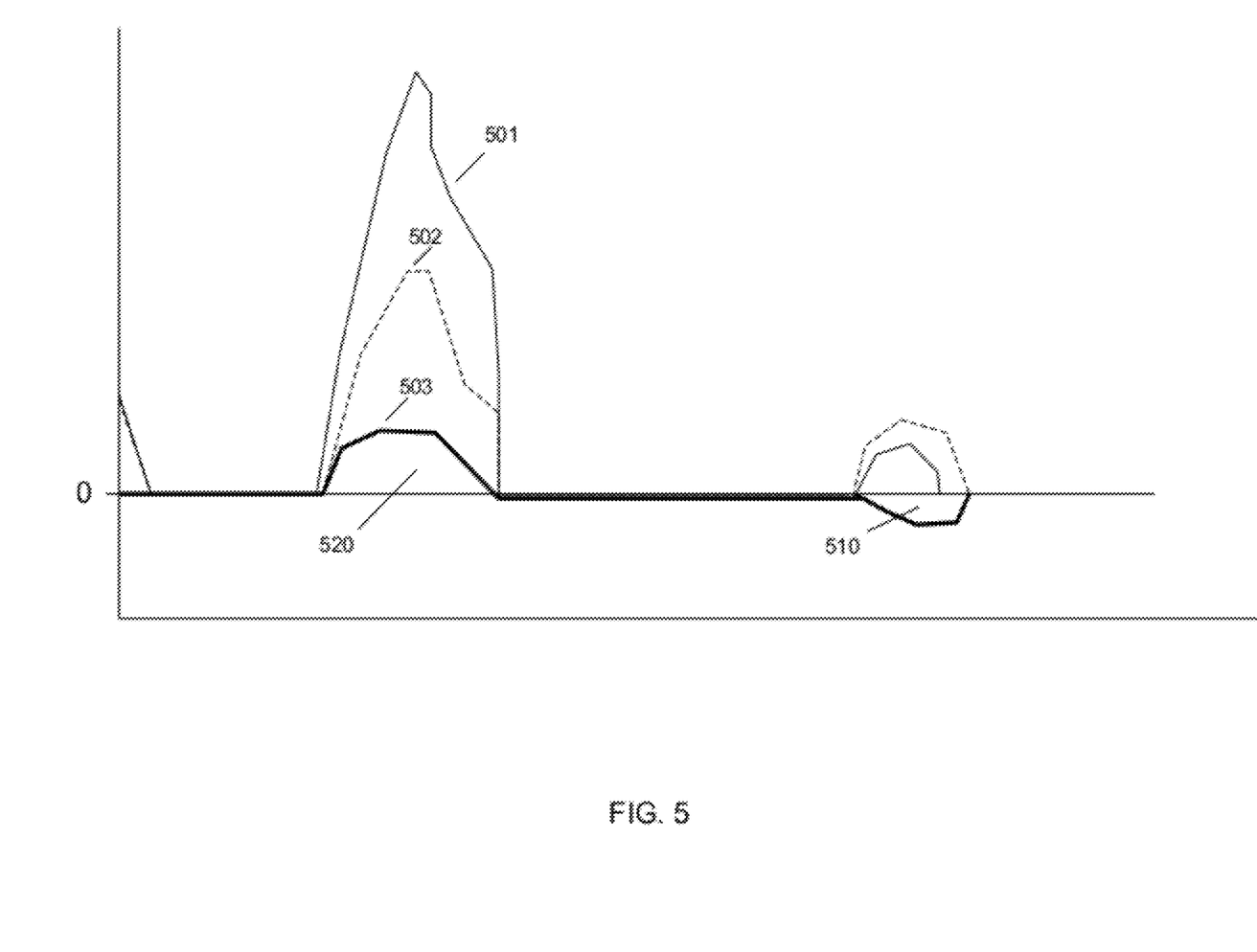
FIG. 5 illustrates a frame histogram.

To detect and classify gray level bands in a text-only video frame, such as the frame illustrated in FIG. 1, embodiments first compute two gray-level histograms 501, 502; one of the original frame 501, shown by a solid black curve in FIG. 5, and the other 502 on the frame after local median filtering, shown by a dashed curve 502. Embodiments then determine the difference 503 between the two histograms, shown by the weighted solid black curve 503. Narrow foreground features 510 are eroded by the filter and are therefore associated with negative difference. Background areas 520 are resilient to the filter and are therefore associated with positive difference. Once bands are separated the image foreground 510 objects can be easily separated and processed. This involves line detection and removal, histogram stretching of bands associated with text, and replacing gray background regions with darker background values, to create a uniform background color of a cleaned text image 400B, as illustrated in FIG. 4B. Once the regions are obtained, embodiments apply an OCR engine, which can be any of a variety of conventional OCR engines, to extract the words in various text regions.

Analyzing Tabular Layout

Figure 6:
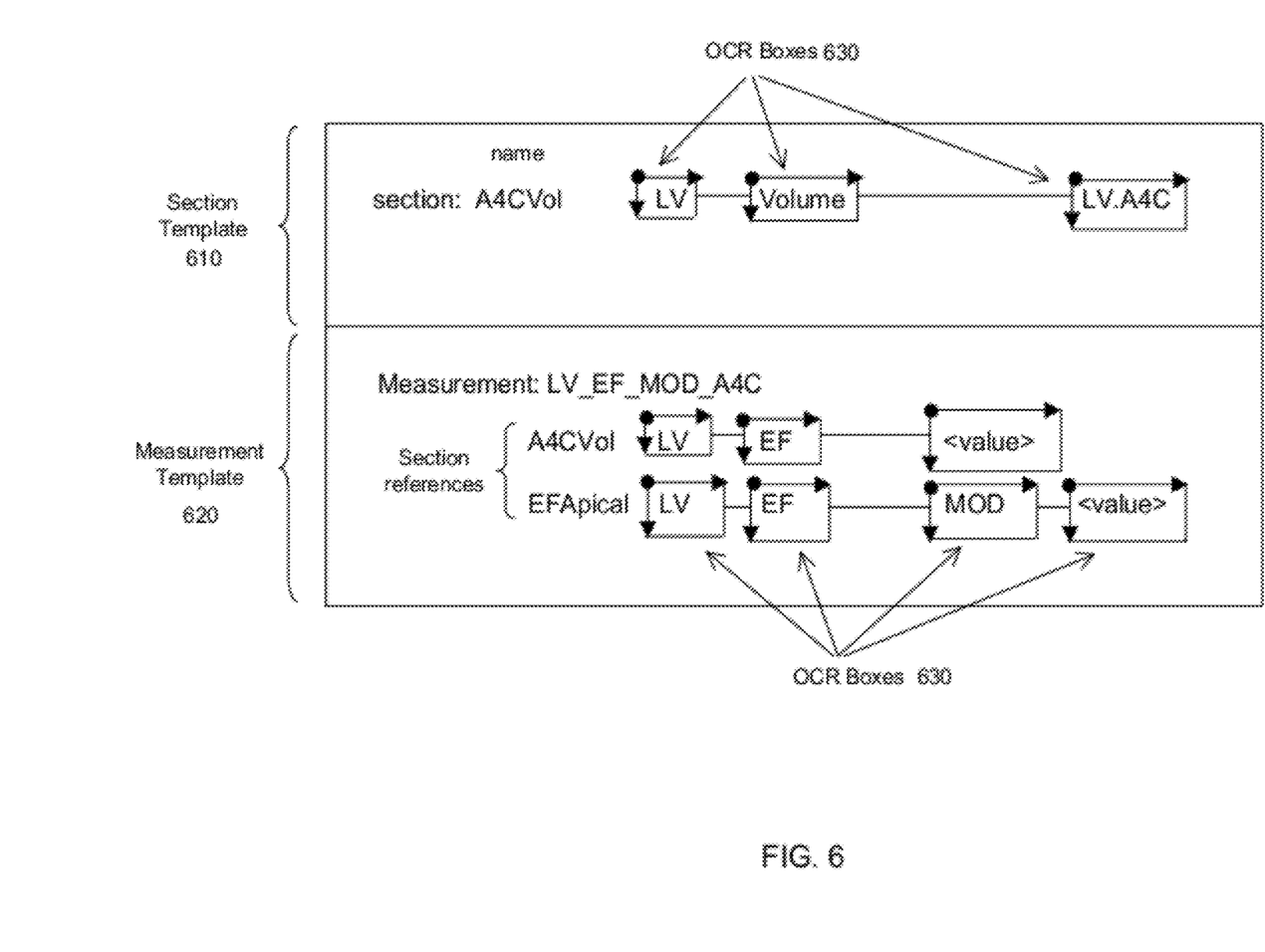
FIG. 6 illustrates example templates.

The extraction of tabular structure in the cleaned text images by embodiments is now described. As described herein, templates for section and measurements within sections, 610, 620 respectively, can be created in a (echo) machine-specific manner. The section template 610 illustrated in FIG. 6, named "A4CVol", for example consists of the words "LV", "Volume", and "LV, A4C", with fixed relative geometry. Given a sample frame from a known machine model, for example a Siemens Sequoia® machine, the section templates 610 can be formed for this machine model, and embodiments use the geometric coordinates of words returned by the OCR engine (OCR boxes 630) as well as the recognized text on sample training text-only video frames, as illustrated in FIG. 6. Embodiments parse OCR words into section blocks. Templates of section headers can be matched against the OCR words and bounding OCR boxes 603. The matched section locations are used to parse the remaining text by section.

The templates 620 for measurements within sections are similarly made as illustrated in FIG. 6. Since the same measurement can be in more than one section, embodiments retain a list of section occurrences for each measurement. Each section occurrence captures the name of the measurement label per row in the section. It also captures the geometric location within the frame of the measurement label and its value.

Measurements consist of a set of templates, one for each section that it may appear in. In this example, the measurement "LV_EF_MOD_A4C" stands for "Left ventricle ejection fraction, method of disks calculation, apical 4 chamber viewpoint". It appears in 2 potential sections, "A4CVol" and "EFApical" with the corresponding OCR templates shown in FIG. 6.

The measurement LV_EF_MOD_A4C is located by matching the OCR templates against all detected "A4CVol" and "EFApical" sections. Notice that the measurement templates include the keyword "<value>", which is used to locate the numeric value of the measurement. After this step, the system reports a list of measurement-value pairs.

Table Analysis

Embodiments employ a table analysis using the section 610 and measurement 620 templates matched to the cleaned text images 400B to extract measurement values.

Figure 7:
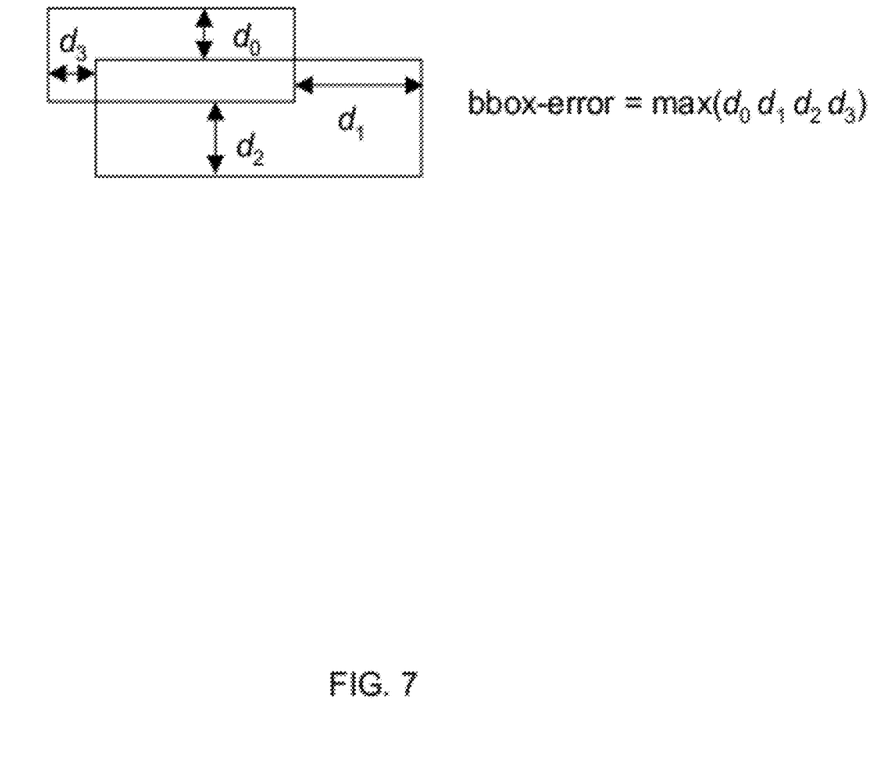
FIG. 7 illustrates geometric distances among optical character recognition (OCR) boxes.

For section recognition, given the OCR boxes 630, the first step to layout analysis is to locate the variable sections on the text-only pages. Embodiments detect variable sections by matching a section definition, sec, to the page OCR output, ocr. Further, let $ocr_i$ be the page OCR starting at the ith word. The best match can be found by "sliding" sec over the page ocr, testing the match at each OCR word $ocr_i$. Let $e_i$ be a text match measure for offset i:

$$e_i = (|sec| - editdist(ocr_i, sec))/|sec| \quad (1)$$

where |sec| is the length of sec in characters and normalizes $e_i$. Let $d_i$ be a geometrical match between word bounding boxes in $ocr_i$ and sec, where sec is translated in y to match the y-coordinate of the first word of $ocr_i$, $y_i$, with the y-coordinate of the first word of sec, $y_{sec}$:

$$d_i = \text{bbox-error}(ocr_i, \text{translate}(sec, y_i - y_{sec})) \quad (2)$$

and bbox-error, depicted in FIG. 7 for one pair of words, is computed for all pairs of words in sec and their corresponding words in $ocr_i$, and finally maximized over words. The match between ocr and sec is finally given by:

$$m(ocr, sec) = \underset{i}{\operatorname{argmax}} \{e_i \mid (e_i > 0.9) \& (d_i < 10)\} \quad (3)$$

where hard constraints are imposed on $e_i$ and $d_i$ and $e_i$ is maximized over the surviving i. Locating section definitions on the text-only pages parses the page vertically; the page OCR is partitioned appropriately according to section, $ocr_{sec}$.

Measurement values can be extracted as follows. Measurements list all sections they can appear in, $sec_j$, along with the appearance of the variable label, $ocr_j$:

$$meas = \{(sec_j, ocr_j)\}.$$

Section detection has detected some number of meas's sections on the current text-only page. For each such detected section, $sec_j$, call the OCR partition of this section $ocr_{seq_j}$. Measurements are extracted by matching $sec_j$'s OCR block $ocr_j$ against the detected partition of $sec_j$, $ocr_{sec_j}$ $$\forall j, IF(sec_j\, detected) \& m(ocr_{sec_j}, ocr_j) THEN$$

$$value_{meas} = \text{word in } ocr_{sec_j} \text{matching} \langle value \rangle \text{ in } ocr_j$$

Thus, a measurement value can be located if it occurs in any of its constituent sections, $sec_j$. All text only pages of a patient visit can processed to extract measurements and the union of all measurements can be reported for patient retrieval.

Decision Support

Embodiments support a variety of applications using the information extracted from videos. For example, embodiments support decision analyses by enabling retrieval of similar patient records given a particular input.

Figure 8:
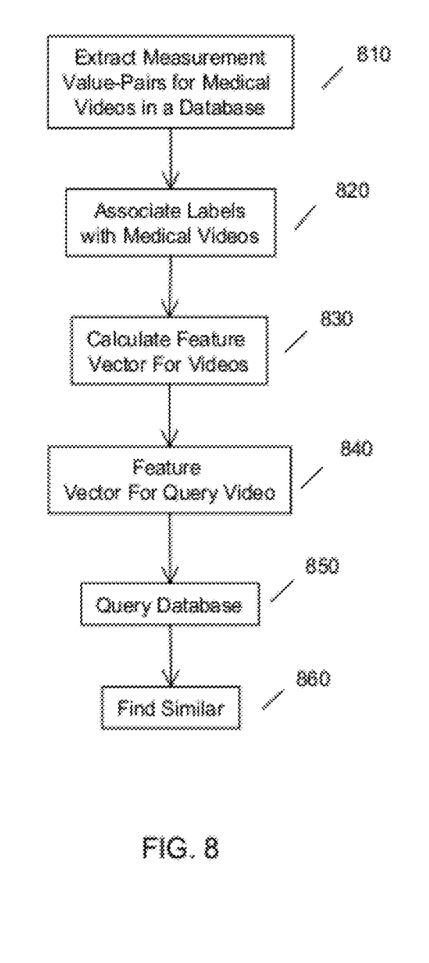
FIG. 8 illustrates an example method for decision support analysis.

As illustrated in FIG. 8, applying extraction to a large database of existing medical record videos to extract measurement-value pairs from the embedded text 810, disease labels can be associated with the videos. The labels can be for example taken either from structured fields in the patient record or through an analysis of the unstructured text reports. Given the extracted measurement-value pairs, a feature vector can be calculated 830 for each video. Using a feature vector for a video 840, a data base query 850 can be made to find similar videos 860 in the database having similar feature vectors.

For example, similarity retrieval of echo videos based on extracted feature-value pairs of measurements is now described. Denoting the set of all feature names found across all text-only pages of videos by $F = \{f_j\}$, an echo video $D_i$ can be characterized by a feature list:

$$H_i = \{(f_j, v_j), f_j \epsilon F_i\} \quad (4)$$

where $f_j$ is the feature and $v_j$ is the value of the feature and $F_i \subset F$. Two features $f_{li} \epsilon F_i$ of video $D_i$ and $f_{mj} \epsilon F_j$ of video $D_j$ match provided, $f_{li} = f_{mj}$ and $|v_{li} - v_{mj}| < \tau$, where $\tau$ is a suitably chosen threshold based on the knowledge of feature semantics. As a non-limiting example, the American Heart Association has defined guidelines for tolerance ranges on cardiac measurements to signal diseases, which can for example be used to serve as feature-specific thresholds. Let the set of matching features between two videos $D_i$ and $D_j$ be denoted by $M_{ij} = \{(f_{li}, f_{mj}), |v_{li} - v_{mj}| < \tau\}$. Then the extent of match of two cardiac videos $D_i$ and $D_j$ is given by $$d(D_i, D_j) = \frac{|M_{ij}|}{|F_i| + |F_j|} \quad (5)$$

Given a query video of a patient, the videos in the database can be ranked based on the above metric and the best matches retained are those with a $d(D_q, D_j) > T$ for a threshold T. The value of T can be varied to achieve desired precision and recall. It should be noted that this is a non-limiting example of ranking, and other ranking techniques/methods may be suitable for particular contexts, such as with use of other video types and feature-specific thresholds.

Decision support through similarity retrieval can include clinical decision support. In clinical decision support, one is primarily interested in inferring the distribution of diseases from the similar videos retrieved. To offer decision support, embodiments retain K matching videos that are within a distance threshold T from the query video in a style reminiscent of collaborative filtering. The choice of K and T is derived through standard cross-validation experiments as done in collaborative filtering.

Let the matches to the query document thus retained be denoted by:

$$D_M = \{D_1, D_2, \ldots D_K\}.$$

Let the disease labels associated with the video $D_i$ be:

$$E_i = \{e_1, e_2, \ldots e_k\}.$$

Then, the ranked list of disease matches is obtained by taking the histogram of hits for the disease labels corresponding to the matching videos. Thus, a rank of a disease label $e_j$ is given by:

$$R(e_j)=|\{E_i|e_j \in E_i\}|/K \qquad (6)$$

The above ranking reflects the principle of collaborative filtering. Thus, a disease label with a high rank means it is a disease label that is voted by the majority of matches, thus increasing its probability of being the correct disease label for the query video. All diseases with a rank $R(e_j)>\delta$ can then retained as valid diseases labels for the query.

Automated Storage Policies

Figure 9:
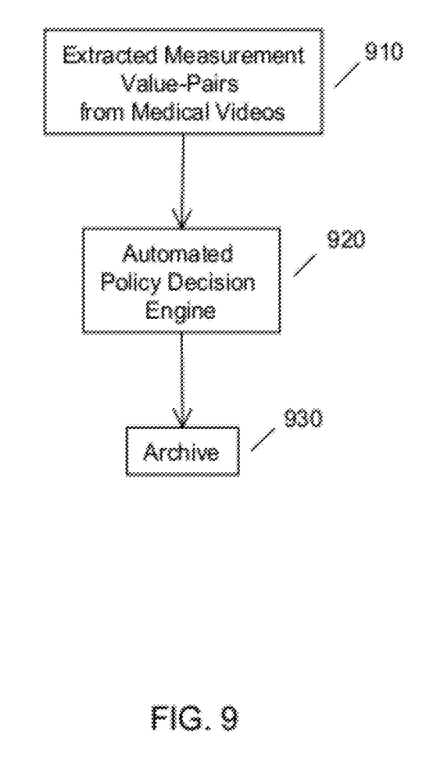
FIG. 9 illustrates an example system for automated archive storage policy determination and execution.

As illustrated in FIG. 9, embodiments enable automated storage policies using measurement-value pairs extracted from videos. For example, a medical video is stored into an archive that supports metadata discovery. This triggers a set of ingestion processing steps, such as described herein, performed by the archive.

The extracted measurement value-pairs from medical videos 910 are input into an automated policy decision engine 920 for automated policy determination. Depending on a particular video's measurement value-pairs, it may be retained, discarded or retained in a different storage form to optimize storage costs. Final processing by the archive declares ingestion of the database of videos complete, resulting in a policy driven archive 930 storage system.

Initial steps in the ingestion processing can include making the medical video immutable (permitting no further writes), calculating a checksum on the content of the medical video (for tamper protection), et cetera followed by a measurement-value extraction step. For measurement-value extraction, the medical video is processed to extract measurement-value pairs as outlined above herein. These values are stored as attributes of the medical video file.

For storage policy determination, the measurement-value pairs extracted are used as input to the storage policy determination engine 920. For example, if the extracted value for the LV_EF_MOD_A4C measurement in the example above in FIG. 1 was in a range indicating normal heart function, a storage policy that will immediately migrate the file to tape to optimize storage costs is applied. Conversely if LV_EF_MOD_A4C indicates heart failure, it is likely that this video will be accessed in the near future and a storage policy such that the medical video remains on disk and potentially replicated to other hospitals/clinics for quick access will be applied. The measurement-value pairs can also be used in setting retention times and the like. Thus, such results can be used as part of the input to a storage policy engine 920 to determine and set the overall storage policy for the medical video. Final processing can include steps such as indexing the measurement-value pairs as well as declaring that all archive ingestion processing steps have completed.

Figure 10:
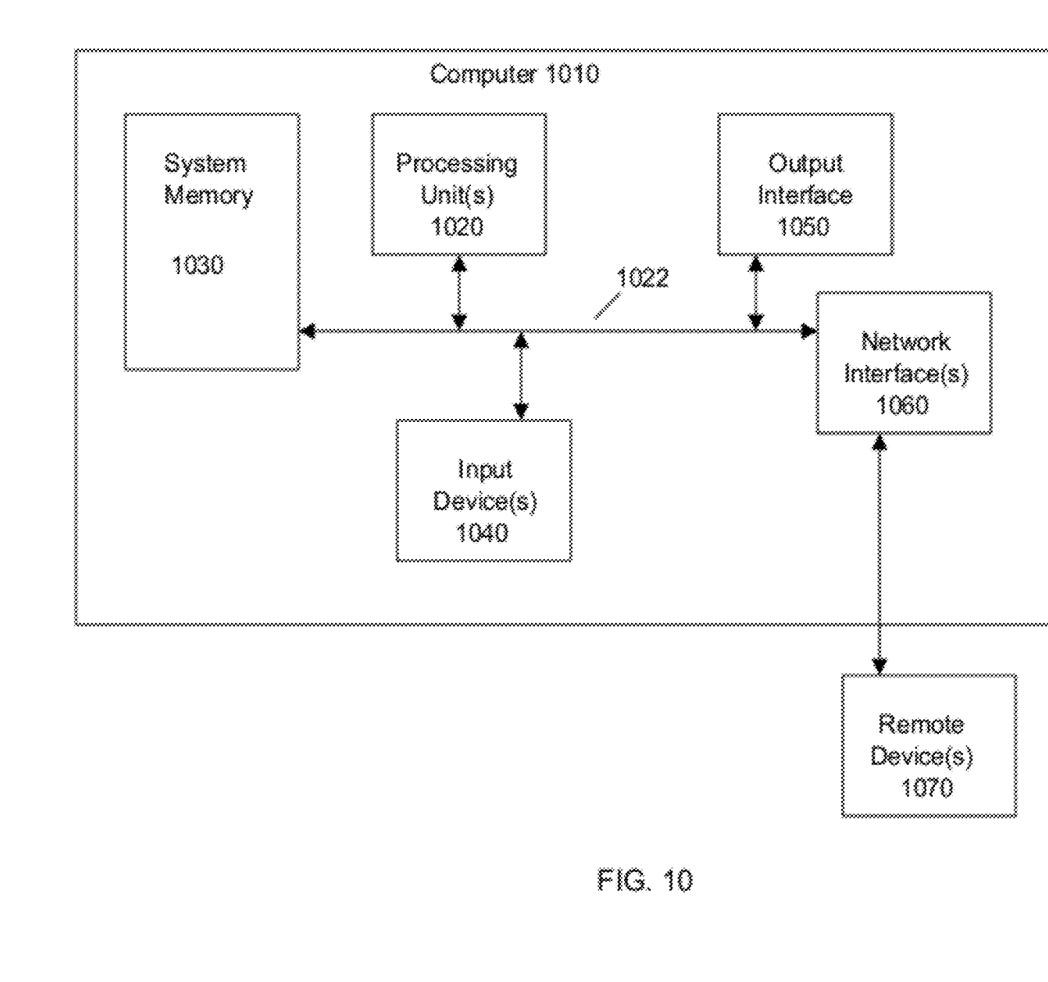
FIG. 10 illustrates an example computer system.

Referring to FIG. 10, it will be readily understood that embodiments can be implemented using any of a wide variety of devices or combinations of devices. An example device that may be used in implementing one or more embodiments includes a computing device in the form of a computer 710. In this regard, the computer 710 may execute program instructions configured to perform accessing of medical video(s) stored in a database, extracting information such as feature value-pairs from the medical videos, associating medical videos with particular labels, organizing the storage of medical videos base on information extracted therefrom, and finding similar medical videos given an input corresponding to a query medical video, and other functionality of the embodiments, as described herein.

Components of computer 1010 may include, but are not limited to, processing units 1020, a system memory 1030, and a system bus 1022 that couples various system components including the system memory 1030 to the processing unit 100. Computer 1010 may include or have access to a variety of computer readable media. The system memory 1030 may include computer readable storage media in the form of volatile and/or nonvolatile memory such as read only memory (ROM) and/or random access memory (RAM). By way of example, and not limitation, system memory 1030 may also include an operating system, application programs, other program modules, and program data.

A user can interface with (for example, enter commands and information) the computer 1010 through input devices 1040. A monitor or other type of device can also be connected to the system bus 1022 via an interface, such as an output interface 1050. In addition to a monitor, computers may also include other peripheral output devices. The computer 1010 may operate in a networked or distributed environment using logical connections to one or more other remote computers or databases, such as databases storing medical video files. The logical connections may include a network, such as a local area network (LAN) or a wide area network (WAN), but may also include other networks/buses.

It should be noted as well that certain embodiments may be implemented as a system, method or computer program product. Accordingly, aspects of the invention may take the form of an entirely hardware embodiment, an entirely software embodiment (including firmware, resident software, microcode, et cetera) or an embodiment combining software and hardware aspects that may all generally be referred to herein as a "circuit," "module" or "system." Furthermore, aspects of the invention may take the form of a computer program product embodied in one or more computer readable medium(s) having computer readable program code embodied therewith.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, et cetera, or any suitable combination of the foregoing.

Computer program code for carrying out operations for aspects of the invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described herein with reference to flowchart illustrations and/or block diagrams of methods, apparatuses (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Although illustrated example embodiments have been described herein with reference to the accompanying drawings, it is to be understood that embodiments are not limited to those precise example embodiments, and that various other changes and modifications may be affected therein by one skilled in the art without departing from the scope or spirit of the disclosure.

What is claimed is:

1. A method for providing one or more video data applications comprising:
   accessing one or more frames of video data;
   preprocessing said one or more frames of video data to produce one or more preprocessed frames;
   extracting embedded characters from said one or more preprocessed frames; and
   utilizing said embedded characters extracted from said one or more preprocessed frames for one or more of a decision support application and an automated archive storage application;
   said decision support application further comprising identifying and retrieving one or more videos comprising at least one feature bearing similarity relative to said one or more frames of video data; and
   said identifying comprising employing collaborative filtering.

2. The method according to claim 1, wherein said video data comprises medical video data and further wherein said embedded characters comprise one or more feature value-pairs.

3. The method according to claim 1, wherein preprocessing said one or more frames further comprises removing one or more non-embedded character features from said one or more frames prior to conducting optical character recognition.

4. The method according to claim 3, wherein extracting embedded characters from said one or more preprocessed frames further comprises conducting optical character recognition with said one or more preprocessed frames as input.

5. The method according to claim 4, wherein extracting embedded characters from said one or more preprocessed frames further comprises extracting name-value pairs from said one or more preprocessed frames and conducting a table analysis using one or more templates.

6. The method according to claim 1, further comprising creating a feature vector characterizing said one or more frames of video data using said embedded characters.

7. The method according to claim 6, wherein said retrieving comprises retrieving one or more medical videos having a feature vector similar to said feature vector characterizing said one or more frames of video data.

8. The method according to claim 7, wherein said identifying comprises identifying said one or more medical videos having a feature vector similar to said feature vector characterizing said one or more frames of video data using collaborative filtering.

9. The method according to claim 1, wherein said automated archive storage application further comprises determining a storage policy for one or more medical videos based on said embedded characters.

10. The method according to claim 1, further comprising:
    creating a feature vector characterizing said one or more frames of video data using said embedded characters;
    said retrieving comprising retrieving one or more videos having a feature vector similar to said feature vector characterizing said one or more frames of video data.

* * * * *